(12) United States Patent
Ravikumar et al.

(10) Patent No.: US 9,906,041 B2
(45) Date of Patent: Feb. 27, 2018

(54) DECENTRALIZED GENERATOR CONTROL

(71) Applicant: Schweitzer Engineering Laboratories, Inc., Pullman, WA (US)

(72) Inventors: Krishnanjan Gubba Ravikumar, Pullman, WA (US); Scott M. Manson, Moscow, ID (US); Sai Krishna Raghupathula, Pullman, WA (US)

(73) Assignee: Schweitzer Engineering Laboratories, Inc., Pullman, WA (US)

( * ) Notice: Subject to any disclaimer, the term of this patent is extended or adjusted under 35 U.S.C. 154(b) by 238 days.

(21) Appl. No.: 15/071,512

(22) Filed: Mar. 16, 2016

(65) Prior Publication Data

US 2017/0271882 A1   Sep. 21, 2017

(51) Int. Cl.
| | |
|---|---|
| *H02J 3/38* | (2006.01) |
| *G05B 15/02* | (2006.01) |
| *H02J 3/46* | (2006.01) |
| *H02J 3/42* | (2006.01) |

(52) U.S. Cl.
CPC ............. *H02J 3/46* (2013.01); *G05B 15/02* (2013.01); *H02J 3/381* (2013.01); *H02J 3/42* (2013.01)

(58) Field of Classification Search
CPC ..... H02J 3/42; H02J 3/46; H02J 3/381; G05B 15/02
See application file for complete search history.

(56) References Cited

U.S. PATENT DOCUMENTS

| | | |
|---|---|---|
| 4,349,744 A | 9/1982 | Reuther |
| 4,387,336 A | 6/1983 | Joy |
| 4,829,298 A | 5/1989 | Fernandes |
| 5,006,846 A | 4/1991 | Granville |
| 5,224,011 A | 6/1993 | Yalla |
| 5,341,265 A | 8/1994 | Westrom |
| 5,446,682 A | 8/1995 | Janke |
| 5,498,956 A | 3/1996 | Kinney |
| 5,592,393 A | 1/1997 | Yalla |
| 5,596,492 A | 1/1997 | Divan |

(Continued)

OTHER PUBLICATIONS

Greg Zweigle, Expand Synchrophasor Capabilities with the Substation Phasor Data Concentrator, Feb. 18, 2010.

(Continued)

*Primary Examiner* — Mark Connolly
(74) *Attorney, Agent, or Firm* — Jared L. Cherry; Richard M. Edge (57) ABSTRACT

The present disclosure pertains to distributed controllers configured to control a plurality of electrical generators in an electrical generation and distribution system. In one embodiment, a distributed controller consistent with the present disclosure may include a communication subsystem to obtain a first plurality of time-stamped electrical parameter measurements from a first node. A measurement analysis subsystem may compare the first plurality of time-stamped electrical parameter measurements and the second plurality of time-stamped electrical parameter measurements. The first node and the second node may be associated in an electrical island by a topology detection subsystem based on the correlation. A control subsystem may be configured to implement a control action based on the association of the first node and the second node in the electrical island.

21 Claims, 7 Drawing Sheets

(56) References Cited

U.S. PATENT DOCUMENTS

| | | | |
|---|---|---|---|
| 5,693,404 | A | 12/1997 | Shiraishi et al. |
| 5,694,281 | A | 12/1997 | Roberts |
| 5,703,745 | A | 12/1997 | Roberts |
| 5,731,943 | A | 3/1998 | Roberts |
| 6,028,754 | A | 2/2000 | Guzman |
| 6,236,949 | B1 | 5/2001 | Hart |
| 6,265,881 | B1 | 7/2001 | Meliopoulos |
| 6,285,917 | B1 | 9/2001 | Sekiguchi |
| 6,341,055 | B1 | 1/2002 | Guzman |
| 6,356,421 | B1 | 3/2002 | Guzman |
| 6,356,471 | B1 | 3/2002 | Fang |
| 6,411,865 | B1 | 6/2002 | Qin |
| 6,442,010 | B1 | 8/2002 | Kasztenny |
| 6,446,682 | B1 | 9/2002 | Viken |
| 6,603,298 | B2 | 8/2003 | Guzman |
| 6,608,742 | B2 | 8/2003 | Schweitzer |
| 6,662,124 | B2 | 12/2003 | Schweitzer |
| 6,694,270 | B2 | 2/2004 | Hart |
| 6,757,146 | B2 | 6/2004 | Benmouyal |
| 6,839,210 | B2 | 1/2005 | Roberts |
| 6,845,333 | B2 | 1/2005 | Anderson |
| 6,946,753 | B2 | 9/2005 | Kemahan |
| 7,072,744 | B2 | 7/2006 | Kuwabara |
| 7,116,010 | B2 | 10/2006 | Lasseter |
| 7,196,884 | B2 | 3/2007 | Guzman |
| 7,233,082 | B2 * | 6/2007 | Furuya ............ H02J 3/38 307/64 |
| 7,319,576 | B2 | 1/2008 | Thompson |
| 7,356,422 | B2 | 7/2008 | Schweitzer |
| 7,457,688 | B2 | 11/2008 | Szepek |
| 7,480,580 | B2 | 1/2009 | Zweigle |
| 7,570,469 | B2 | 8/2009 | Guzman |
| 7,582,986 | B2 | 9/2009 | Folkers |
| 7,630,863 | B2 | 12/2009 | Zweigle |
| 7,635,967 | B2 | 12/2009 | Loucks |
| 7,660,088 | B2 | 2/2010 | Benmouyal |
| 7,710,693 | B2 | 5/2010 | Guzman |
| 7,761,910 | B2 | 7/2010 | Ransom |
| 7,856,327 | B2 | 12/2010 | Schweitzer |
| 7,903,381 | B2 | 3/2011 | Fischer |
| 7,930,117 | B2 | 4/2011 | Guzman-Casillas |
| 8,082,367 | B2 | 12/2011 | Etheridge |
| 8,410,633 | B2 | 4/2013 | Batzler |
| 8,560,255 | B2 | 10/2013 | Elwarry |
| 8,965,592 | B2 | 2/2015 | Manson |
| 9,008,850 | B2 | 4/2015 | Manson |
| 2004/0021470 | A1 | 2/2004 | Adams |
| 2004/0027748 | A1 | 2/2004 | Kojovic |
| 2004/0059469 | A1 | 3/2004 | Hart |
| 2004/0138834 | A1 | 7/2004 | Blackett |
| 2004/0252525 | A1 | 12/2004 | Aldridge |
| 2005/0144437 | A1 | 6/2005 | Ransom |
| 2006/0224336 | A1 | 10/2006 | Petras |
| 2006/0259255 | A1 | 11/2006 | Anderson |
| 2007/0086134 | A1 | 4/2007 | Zweigle |
| 2007/0100504 | A1 | 5/2007 | Moxley |
| 2007/0103004 | A1 | 5/2007 | Chou |
| 2007/0219755 | A1 | 9/2007 | Williams |
| 2007/0222294 | A1 | 9/2007 | Tsukida |
| 2007/0239372 | A1 | 10/2007 | Schweitzer |
| 2008/0040296 | A1 | 2/2008 | Bridges |
| 2008/0204044 | A1 | 8/2008 | Ponnaluri |
| 2008/0232005 | A1 | 9/2008 | Kuehnle |
| 2008/0281540 | A1 | 11/2008 | Zweigle |
| 2009/0021082 | A1 | 1/2009 | Loucks |
| 2009/0079266 | A1 | 3/2009 | McNamara |
| 2009/0085407 | A1 | 4/2009 | Venkatasubramanian |
| 2009/0088989 | A1 | 4/2009 | Guzman |
| 2009/0088990 | A1 | 4/2009 | Schweitzer |
| 2009/0089608 | A1 | 4/2009 | Guzman |
| 2009/0091867 | A1 | 4/2009 | Guzman |
| 2009/0099798 | A1 | 4/2009 | Gong |
| 2009/0125158 | A1 | 5/2009 | Schweitzer |
| 2009/0198383 | A1 | 8/2009 | Gardner |
| 2009/0254655 | A1 | 10/2009 | Kidwell |
| 2009/0276173 | A1 | 11/2009 | Wang |
| 2010/0002348 | A1 | 1/2010 | Donolo |
| 2010/0104847 | A1 | 4/2010 | Ciavatta |
| 2010/0114390 | A1 | 5/2010 | Stevenson |
| 2010/0145536 | A1 | 6/2010 | Masters |
| 2010/0152910 | A1 | 6/2010 | Taft |
| 2010/0198423 | A1 | 8/2010 | Hirst |
| 2011/0004324 | A1 | 1/2011 | Bickel |
| 2011/0022734 | A1 | 1/2011 | Etheridge |
| 2011/0062708 | A1 | 3/2011 | Prochaska |
| 2011/0068576 | A1 | 3/2011 | Meier |
| 2011/0077885 | A1 | 3/2011 | Zweigle |
| 2011/0190958 | A1 | 8/2011 | Hirst |
| 2011/0213606 | A1 | 9/2011 | Seaman |
| 2011/0251732 | A1 | 10/2011 | Schweitzer |
| 2011/0298286 | A1 | 12/2011 | Batzler |
| 2012/0226386 | A1 | 9/2012 | Kulathu |
| 2015/0244170 | A1 * | 8/2015 | Bartlett ............ H02J 4/00 700/287 |
| 2017/0270414 | A1 * | 9/2017 | Ignatova ............ G06N 5/04 |

OTHER PUBLICATIONS

Andrew Swinghamer, Create a Synchrophasor Network with the SEL-3378 Synchrophasor Vector Processor, Aug. 6, 2009.

Yanfeng Gong, Using Synchrophasor-Based Modal Analysis to Detect Unstable Power System Oscillations, Jun. 24, 2009.

Schweitzer Engineering Laboratories, Inc., Case Study, Powergrid Corporation—India, Using Wide-Area Synchrophasor Measurements to Improve System Reliability, Sep. 10, 2010.

Schweitzer Engineering Laboratories, Inc., SEL-3378 Instruction Manual, Apr. 4, 2008.

Schweitzer Engineering Laboratories, Inc., SEL-3530 Real-Time Automation Controller RTAC Instruction Manual, Sep. 15, 2009.

Terry L. Conrad, Distributed State Estimator at U.S. Virgin Islands Water and Power Authority St. Thomas and St. John, NASPI Working Group Meeting, Mar. 7, 2008.

A.P. Sakis Meliopoulos, George J. Cokkinides, Floyd Galvan, Bruce Fardanesh, Distributed State Estimator-Advances and Demonstration, Jan. 2008.

Pserc- Ali Abur andMladen Kezunovic, Sakis Meliopoulos, Enhanced State Estimation by Advanced Substation Monitoring, Power Systems Engineering Research Center, Nov. 2002.

Saman A. Zonouz and William H. Sanders, A Kalman-based Coordination for Hierarchical State Estimation: Algorithm and Analysis, Jan. 2008.

ABB: Improved Power System Performance through Wide Area Monitoring, Protection, and Control, Jan. 2004.

ABB, Wide Area Measurement, Monitoring, Protection and Control Industrial IT for Energy System Operation-, Jan. 2003.

Sasa Jakovljevic, Mladen Kezunovic, Software for Enhanced Monitoring in Integrated Substations, 2003 IEEE Bologna Power Tech Conference, Jun. 23-26, 2003.

Y. Wu, M. Kezunovic, Automatic Simulation of IED Measurements for Substation Data Integration Studies, Power Engineering Society General Meeting, Jun. 12-16, 2005.

Sasa Jakovljevic, Data Collecting and Processing for Substation Integration Enhancement, May 2003.

M. Kezunovic, G. Latisko, Automated Monitoring Functions for Improved Power System Operation and Control, Power Engineering Society General Meeting, Jun. 12-16, 2005.

PCT/US2011/046437 International Search Report and Written Opinion of the International Searching Authority, Patent Cooperation Treaty, Dec. 16, 2011.

Arshad Saleem, Agent Services for Situation Aware Control of Power Systems with Distributed Generation, 2009 IEEE [retrieved on Jan. 28, 2013 from the internet <url:http://orbit.dtu.dk/fedora/objects/orbit:55496/datastreams/file_3761170/content> ].

Chanin Choniratisai, HVDC Stability Functions and Implementation in Thailand, CEPSI 2004. [retrieved on Jan. 28, 2013 from the internet <URL://http://www.researchgate.net/CEPSI2004> ].

PCT/US2012/0068962 International Search Report and Written Opinion of the International Searching Authority, Patent Cooperation Treaty, Feb. 25, 2013.

(56) References Cited

OTHER PUBLICATIONS

G.T. Heydt, C.C. Liu, A.G. Phadke, V. Vittal, Solutions for the Crisis in Electric Power Supply, IEEE Computer Applications in Power, Jul. 2001.

Luc Meysenc, M. Jylhakallio, Peter Barbosa, Power Electronics Cooling Effectiveness Versus Thermal Inertia, IEEE Transactions on Power Electronics, vol. 20, No. 3, May 2005.

R.A. Walling, N.W. Miller, Distributed Generation Islanding-Implications on Power System Dynamic Performance, IEEE Power Enginnering Society Summer Meeting vol. 1, Jul. 25, 2002.

M. Ezzt, M.I. Marei, M. Abdel-Rahman, M.M. Mansour, A Hybrid Strategy for Distributed Generators Islanding Detection, IEEE PES Power Africa 2007 Conference and Exposition Johannesburg, South Africa, May 16-20, 2007.

Mats Larsson, Christian Rehtanz, Predictive Frequency Stability Control Based on Wide-Area Phasor Measurements, IEEE Power Engineering Society Summer Meeting vol. 1, Jul. 2002.

Jun Yin, Liuchen Chang, Chris Diduch, Recent Developments in Islanding Detection for Distributed Power Generation, IEEE Power Engineering, Jul. 2004.

Xiaoming Wang, Vijay Vittal, System Islanding Using Minimal Cutsets with Minimum Net Flow, IEEE Power Systems Conference and Exposition, Oct. 2004.

Dongchen Hu, Vaithianathan Venkatasubramanian, New Wide Area Algorithms for Detection and Mitigation of Angle Instability Using Synchrophasors, IEEE Power Engineering Society General Meeting, Jun. 2007.

Robert J. Best, D. John Morrow, David J. McGowan, Peter A. Crossley, Synchronous Islanded Operation of a Diesel Generator, IEEE Transactions on Power Systems, vol. 22, No. 4, Nov. 2007.

Olof Samuelsson, Helga Johannsdottir, Nils Gustavsson, Thorhallur Hrafnsson, Daniel Karlsson, Mike Kockott, Johan Salj, Arve Sollie, Power System Damping in Iceland Based on Phasor Measurements, Jul. 2, 2006.

Gabriel Benmouyal, E. O. Schweitzer, A. Guzman, Synchronized Phasor Measurement in Protective Relays for Protection, Control, and Analysis of Electric Power Systems, 29th Annual Western Protective Relay Conference, Oct. 22-24, 2002.

A.G. Phadke, Synchronized Phasor Measurement in Power Systems, IEEE Comput. Appl., vol. 6, No. 2, pp. 10-15, Apr. 1993.

Edmund O. Schweitzer, III, David Whitehead, Armando Guzman, Yanfeng Gong, Marcos Donolo, Advanced Real-Time Synchrophasor Applications, Western Protective Relay Conference, Oct. 2008.

Dale Williston, Dale Finney, Consequences of Out-of-Phase Reclosing on Feeders with Distributed Generators, Dec. 3, 2010.

Michael J. Thompson, Fundamentals and Advancements in Generator Synchronizing Systems, Dec. 9, 2010.

Michael J. Thompson, New Developments in Generator Synchronizing Systems, Feb. 10, 2011.

PCT/US2012/055107 Patent Cooperation Treaty, International Search Report and Written Opinion of the International Searching Authority, Nov. 23, 2012.

* cited by examiner

DECENTRALIZED GENERATOR CONTROL

RELATED APPLICATION (None)

TECHNICAL FIELD

This disclosure relates to systems and methods for control of electrical generators in an electric power generation and distribution system.

BRIEF DESCRIPTION OF THE DRAWINGS

Non-limiting and non-exhaustive embodiments of the disclosure are described, including various embodiments of the disclosure with reference to the figures included in the detailed description.

DETAILED DESCRIPTION

Electrical power generators in an electrical power generation and distribution system may operate in conjunction with protection systems designed to maintain system stability and prevent damage to the electrical power generators that may be caused by certain conditions. Various protection systems may operate at different levels in an electrical power generation and delivery system. For example, in a centralized control approach, one level of generator protection may be provided at the generator-level and a centralized control system may operate above the generator-level. The generator-level control systems may comprise a control device associated with each generator. Such control devices may adjust the voltage, frequency, and power output of each generator. The generator-level devices may lack information about the operation of the system as a whole, and as such, the master control system may coordinate the action of the generators at a system-level. The master control system may receive information from a plurality of sources, including the generator-level control devices. In addition, the master control system may receive information about the electrical load supplied by the generators and the topology of the system. The master control system may use such information to balance the generation capacity of the generators with the load requirements of the system, track the topology of the system, etc. In various embodiments, the topology of the system may be tracked by monitoring the status of breakers in the system. As may be appreciated, the centralized control system utilizes information from a large number of sources. Enabling communication with this large number of sources may be challenging.

Various embodiments disclosed herein are configured to provide protection decentralized control and protection of systems including multiple generators. In various embodiments consistent with the present disclosure a plurality of controllers may perform slow speed and high speed rebalancing of multiple generators. The plurality of controllers may communicate through a communication network to coordinate actions that affect the system. The plurality of controllers may be time synchronized to a common time source (e.g., a GNSS time signal), and may measure electrical parameters (e.g., voltage, frequency, current, etc.) associated with the plurality of generators.

A decentralized generator control system consistent with the present disclosure may perform a variety of functions, including: slow-speed control actions, high-speed control actions, and system topology determinations. Slow-speed control actions may refer to voltage control, frequency control, tie-line dispatch control, generator synchronization, etc. Voltage control refers to power factor based, voltage based, and VAR based voltage control. The voltage of each generator may be controlled based on an excitation voltage applied to field coils of the generators. Frequency control may be realized by adjustment of a governor associated with the generator. Tie line dispatch and control may manage any tie line power flow based on P and Q measurements. A decentralized controller consistent with the present disclosure may be responsible for synchronization of individual generators and system islands.

High-speed control actions may refer to breaker-based load shedding initiation and real power based primary generation shedding. Breaker-based load shedding may monitor the breaker status of each generator and may calculate an available reserve margin within the system to initiate load shedding actions. Real power based primary generation shedding may determine the loss of load or separation of islands in cases where the islands have excess generation capacity. Where excess generation is present, the controller may shed generation or run back generator output.

In various embodiments, systems and methods consistent with the present disclosure may determine whether generators are electrically connected within the same power system network. Controllers associated with the generator may determine information based on electrical parameters (e.g., magnitude and phase angle) associated with a plurality of generators, rather than basing such determinations on deterministic topology tracking. When a standing angle exists between a plurality of generators, systems and methods consistent with the present disclosure may determine that such devices are connected within the same electrical network. For example, if there are three devices that have a standing angle with respect to each other and if there are two other devices that do not exhibit the standing angle, systems and methods consistent with the present disclosure may determine that the three devices are electrically connected within a particular island and the other two devices are part of another island. Determining electrical connections among generators using electrical parameters may avoid the complexity of deterministic systems that rely on tracking of breaker status while additionally providing a faster response than a frequency-based scheme.

The systems and methods disclosed herein for protection of electrical generators may be applied to electrical power generation and delivery systems. Certain embodiments disclosed herein may be used in connection with systems capable of functioning as "islanded systems." As the term is utilized herein, an islanded system comprises any system in which electric power generators continue to provide electrical power in the absence of a connection to an electrical utility grid. For example, an islanded system may include a utility connected system that includes a distributed generation generator, a backup generator, or the like. Many types of facilities may utilize backup electrical systems (e.g., hospitals, oil refineries, gas separation plants, data centers, and the like), and may operate as an islanded system when electrical power from a electrical utility grid is unavailable. Other systems may generate their own power under typical conditions (e.g., an offshore drilling ship, exploration ships, cruise ships, military ships, and remote facilities that are not connected to an electrical utility grid). Finally, the systems and methods disclosed herein may be used in the protection of electrical generators connected to electrical delivery systems (e.g., a utility grid). For example, a protection system may be used at a generation site (e.g., a fossil-fuel generation site, a hydroelectric site, a wind farm, and the like).

Islanded electrical power generation and delivery systems may also be referred to as a micro-grid. Micro-grid systems may not have the advantage of being able to receive power from an electric utility grid, and accordingly, micro-grid systems may be designed with redundancies, in order to maximize the availability of electrical power. A micro-grid system may, for example, include multiple electrical generators. Further, the micro-grid system may be configured such that if an electrical generator is taken off-line, either for maintenance or because of a problem, the micro-grid system may continue to operate, although perhaps with reduced capabilities. Various embodiments disclosed herein may provide protection and monitoring of a plurality of electrical power generators, and further, may be configured to implement control actions in order to configure an electric power generation and delivery system.

In some embodiments, systems and methods consistent with the present disclosure may identify power system network connections between generators based on time-synchronized measurements of electrical parameters associated with the generators. In contrast, it may commonly be required for a control system in an islanded electrical power generation and delivery system to monitor the status of a large number of breakers throughout the system. Using this information, a system may determine the topology of the electrical system. The cost and complexity associated with tracking the status of all breakers in the system may be avoided by the systems and methods disclosed herein.

Several aspects of the embodiments described may be implemented as software modules or components. As used herein, a software module or component may include any type of computer instruction or computer executable code located within a memory device and/or transmitted as electronic signals over a system bus or wired or wireless network. A software module or component may, for instance, comprise one or more physical or logical blocks of computer instructions, which may be organized as a routine, program, object, component, data structure, etc., that performs one or more tasks or implements particular abstract data types.

In certain embodiments, a particular software module or component may comprise disparate instructions stored in different locations of a memory device, which together implement the described functionality of the module. Indeed, a module or component may comprise a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules or components may be located in local and/or remote memory storage devices. In addition, data being tied or rendered together in a database record may be resident in the same memory device, or across several memory devices, and may be linked together in fields of a record in a database across a network.

Embodiments may be provided as a computer program product including a non-transitory computer and/or machine-readable medium having stored thereon instructions that may be used to program a computer (or other electronic device) to perform processes described herein. For example, a non-transitory computer-readable medium may store instructions that, when executed by a processor of a computer system, cause the processor to perform certain methods disclosed herein. The non-transitory computer-readable medium may include, but is not limited to, hard drives, floppy diskettes, optical disks, CD-ROMs, DVD-ROMs, ROMs, RAMs, EPROMs, EEPROMs, magnetic or optical cards, solid-state memory devices, or other types of machine-readable media suitable for storing electronic and/or processor executable instructions.

Figure 1A:
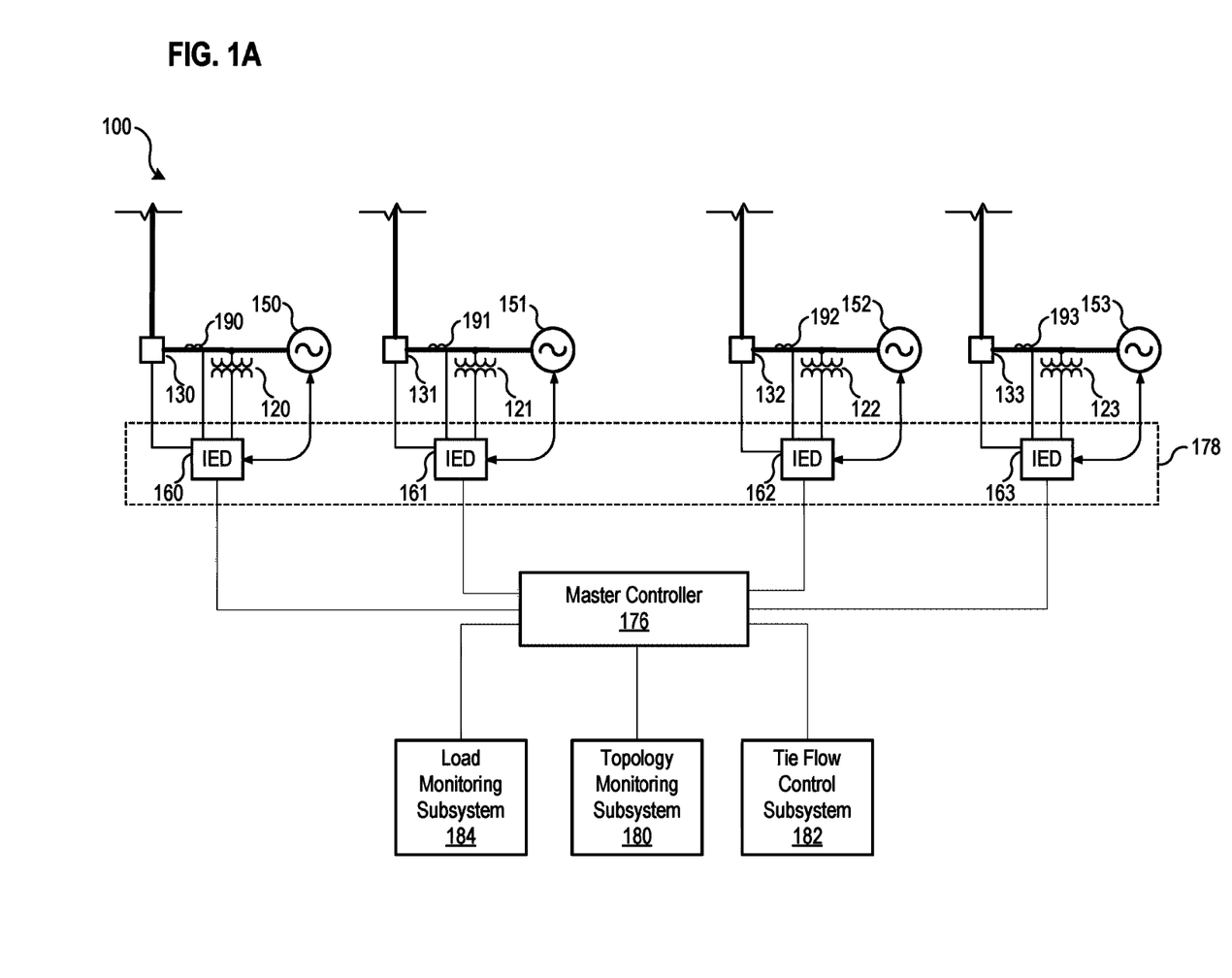
FIG. 1A illustrates a simplified one-line diagram of an electric power generation system including a generator-level protection system and a master control system.

FIG. 1A illustrates a simplified one line diagram of an electric power generation system 100 including a generator-level control system 178 and a master controller 176. System 100 includes a plurality of generators that may be configured to provide electrical power to a plurality of loads. System 100 includes, among other things, generators 150, 151, 152, and 153, each of which is configured to generate a sinusoidal waveform. Generators 150-153 may be driven by a variety of sources, including two- and four-cycle diesel engines, combustion turbines, steam turbines, wind turbines, hydroelectric turbines, and the like. Although illustrated as a one-line diagram, electric power delivery system 100 may represent a three phase power system. FIG. 1A illustrates a single phase system for simplicity.

IEDs 160-163 as shown in FIG. 1A, may be configured to control, monitor, protect and/or automate the operation of system 100. Generators 150-153 may be in electrical communication with IEDs 160-163. As used herein, the term IED refers to any microprocessor-based device that monitors, controls, automates, and/or protects monitored equipment within an electric power system. Such devices may include, for example, remote terminal units, differential relays, distance relays, directional relays, feeder relays, overcurrent relays, voltage regulator controls, voltage relays, breaker failure relays, generator relays, motor relays, automation controllers, bay controllers, meters, recloser controls, communications processors, computing platforms, programmable logic controllers (PLCs), programmable automation controllers, input and output modules, motor drives, and the like. IEDs gather status information from one or more pieces of monitored equipment. IEDs may receive information concerning monitored equipment using sensors, transducers, actuators, and the like.

IEDs 160-163 may also gather and transmit information about monitored equipment using current transformers (CTs) 190, 191, 192, and 193, and potential transformers (PTs) 120, 121, 122, and 123. IEDs may be configured to monitor and communicate information, such as voltages, currents, equipment status, temperature, frequency, pressure, density, infrared absorption, radio-frequency information, partial pressures, viscosity, speed, rotational velocity, mass, switch status, valve status, circuit breaker status, tap status, meter readings, and the like. IEDs may also be configured to communicate calculations, such as phasors (which may or may not be time-synchronized as synchrophasors), events, fault distances, differentials, impedances, reactances, frequencies, and the like. IEDs may also communicate settings information, IED identification information, communications information, status information, alarm information, and the like. Information of the types listed above, or more generally, information about the status of monitored equipment is referred to as monitored equipment data.

IEDs 160-163 may also issue control instructions to monitored equipment (e.g., generators 150-153) in order to control various aspects relating to the monitored equipment. For example, when the system experiences excess generation, one or more of generators 150-153 may be electrically disconnected from system 100 by opening one or more of breakers 130-133. Other examples of control instructions that may be implemented using IEDs may be known to one having skill in the art, but are not listed here. Information of the types listed above, or more generally, information or instructions directing an IED or other device or equipment to perform a certain action are referred to as control instructions.

System 100 includes a generator-level control system 178 and a master controller 176. IEDs 160-163 may be configured to directly control an associated generator 150-153, while controller master controller 176 may coordinate the high level operation of system 100. Master controller 176 may receive and process relevant information from the generator-level control system 178 and may provide control and decisions system-level protection actions.

Master controller 176 may further receive information from load monitoring subsystem 184 and topology monitoring subsystem 180. Topology monitoring subsystem 180 may be configured to track topology changes and provide a deterministic representation of the state of the electrical connections in system 100. For example, topology monitoring subsystem 180 may track the status of breakers in system 100. Load monitoring subsystem 184 may be configured to monitor the status of loads in the system and to balance generation with demand. Using information from all of the various inputs, master controller 176 may implement appropriate actions to balance the generation and consumption of electrical energy and maintain the stability of system 100. In various embodiments, system 100 may be configured to operate in with or without a tie to an electrical utility. In embodiments in which system 100 includes a utility tie, tie flow control subsystem 182 configured to manage the utility tie connection based on tie line P and Q measurements.

Figure 1B:
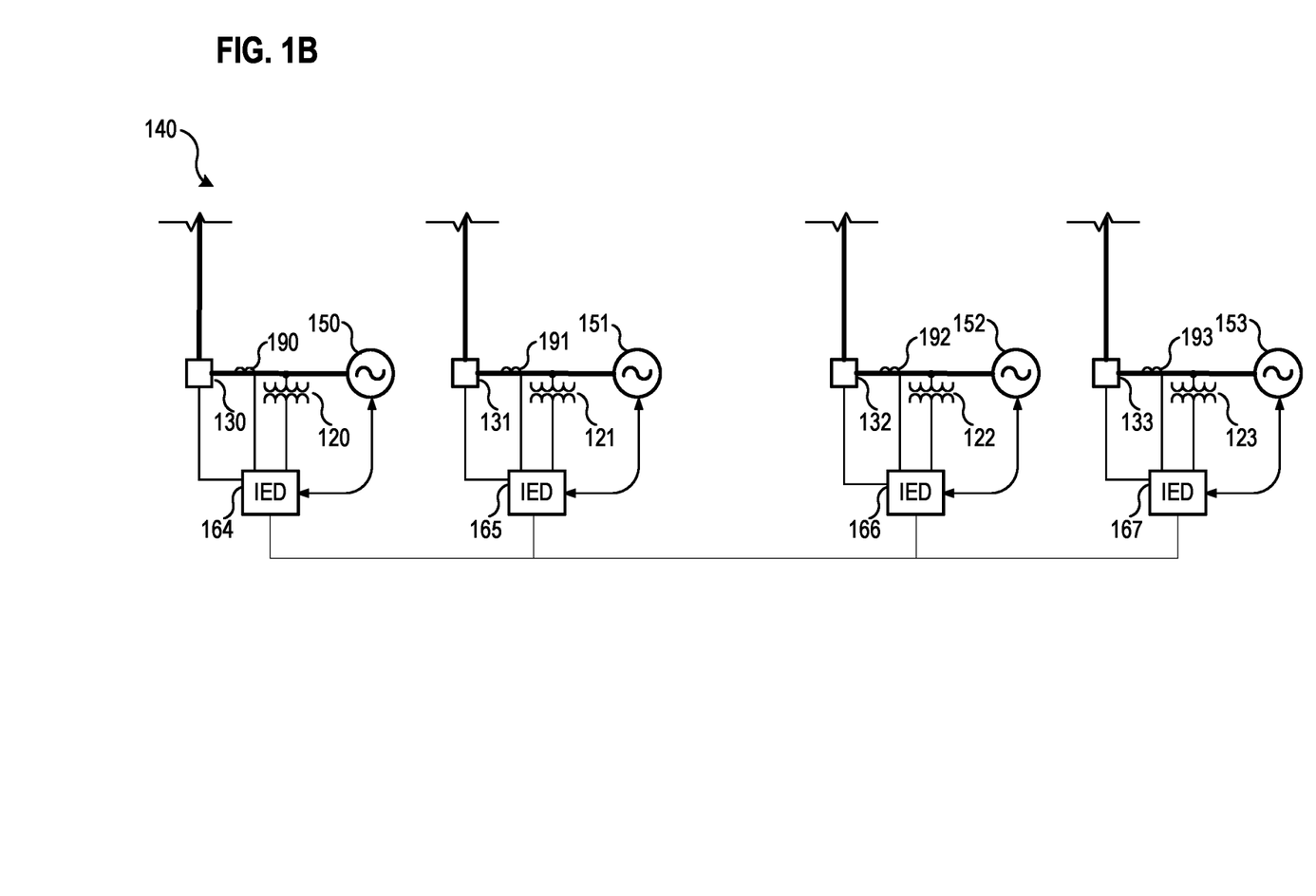
FIG. 1B illustrates a system including decentralized control system comprising a plurality of IEDs consistent with embodiments of the present disclosure.

FIG. 1B illustrates a system 140 including decentralized control system comprising IEDs 164-167 consistent with embodiments of the present disclosure. IEDs 164-167 may communicate via a network, and may exchange information about the operation of system 140. In various embodiments, IEDs 164-167 may receive a common time signal (e.g., a global navigation satellite system). Using the common time signal, IEDs 164-167 may measure the three phase voltages on the generator terminal and associate such measurements with a time stamp. IEDs 164-167 may implement the control actions performed by master controller 176 in FIG. 1A and generator-level control system 178.

IEDs 164-167 may be configured to make and communicate time-aligned measurements. A common time signal may be distributed throughout system 140. In various embodiments, the time signal may be distributed in system 100 using a communications network or using a common time source, such as a Global Navigation Satellite System ("GNSS"), or the like. Utilizing a common or universal time source may ensure that IEDs 164-167 have a synchronized time signal that can be used to generate time synchronized data, such as synchrophasors.

System 140 may determine the topology of the system by comparison of phase angle and/or frequency of electrical nodes. Nodes sharing the same frequency and/or phase angle may be electrically connected, or are a part of the same electrical island. In some embodiments, use of time-aligned measurements to determine topology may avoid the need for deterministic tracking of topology based on breaker status.

Still further, electrical loads may be monitored using the time-aligned measurements collected by IEDs 164-167. In case of excess generation, generation shedding may be used to control frequency of system 140. Excess generation may occur when a load is disconnected. Disconnection of an electrical load causes the connected generators to accelerate in proportion to the electrical energy consumed by the load. The magnitude of the disconnected load may be quantified by determining the acceleration of each connected generator. The sum of the changes of all the connected generators is equal to the disconnected load. If the generators 150-153 have different physical characteristics, the responses to the change in the load will result in divergent responses. The effects of such divergence may be mitigated by analyzing the responses of the generators as close in time as possible to the disconnection. A high-frequency rate may permit determination of the loss of the load without detailed modeling of the physical parameters of each generator. Quantification of one or more lost loads may be used to curtail generation and to maintain the frequency of the system 140.

In addition to determination of the loss of electrical loads, the generators may be monitored to determine excess loads. The addition of loads may cause the connected generators to decelerate in proportion to the electrical energy consumed by the load. The magnitude of the added load may be quantified by determining the deceleration of each connected generator. The sum of the changes of all the connected generators is equal to the added load.

Figure 2:
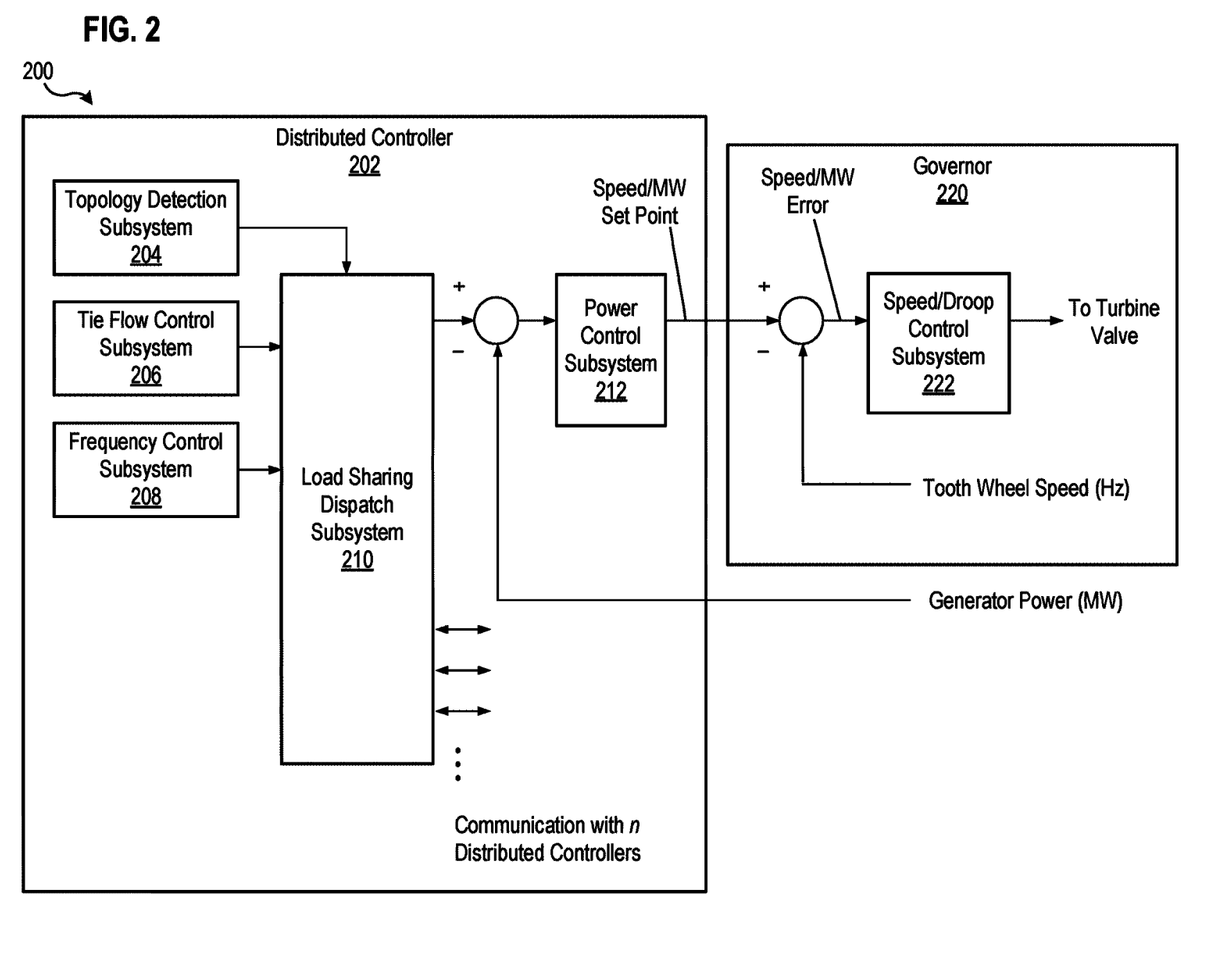
FIG. 2 illustrates a functional block diagram of a system comprising a distributed controller configured to coordinate with a plurality of other distributed controllers in an electrical power system consistent with embodiments of the present disclosure.

FIG. 2 illustrates a functional block diagram of a system 200 comprising a distributed controller 202 configured to coordinate with a plurality of other distributed controllers operation of an electrical power system consistent with embodiments of the present disclosure. Distributed controller 202 may be configured to control the frequency of a generator in conjunction with a plurality of other distributed generator control devices. Distributed controller 202 may include a topology detection subsystem 204. A topology detection subsystem 204 may be configured to monitor the topology of an electrical system.

A tie flow control subsystem 206 may be configured to manage a utility tie. In various embodiments electrical energy may be received from a utility. Utility power may supplement power generated from generators in system 200 when the power generated is insufficient to satisfy the requirements of the load.

A frequency control subsystem 208 may be configured to monitor the frequency of an electrical system and control a generator. Frequency control subsystem 208 may monitor the frequency of an electrical system and adjust the frequency to synchronize generators to an electrical island prior to electrically connecting the generator to the island. Each time an electrical generator is activated, it may need to be synchronized to being connected to an electrical system. Distributed controller 202 may utilize representations of electrical conditions associated with the output of the generator, such as measurements of the frequency and voltage of the generator and the electrical system, to adjust operating parameters of the generator (e.g., speed, phase, excitation voltage, etc.) to synchronize the generator and the electrical island. Once the generator and the bus are synchronized, the generator may be electrically connected to the bus and may provide electrical power to the electrical island.

A load sharing dispatch subsystem 210 may be configured to control the generator and to coordinate the operation of a plurality of other generators controlled by other distributed controllers. Communication with other distributed controllers (not shown) may be facilitated through a communication network. In one embodiment, distributed controller 202 may communicate with other distributed controllers via an Ethernet communication interface. Other forms of communication networks may be used in other embodiments.

In various embodiments, load sharing dispatch subsystem 210 may implement an equal percentage load sharing scheme. In such embodiments, the generators are loaded equally so that when a power system disturbance occurs, the generators governors have the maximum available to capacity to increase or decrease the output of the generators. In contrast, if the loads are not evenly disturbed, and one turbine is operating near its upper limit, the highest loaded unit may not be able to actively participate in addressing a disturbance. Various control systems consistent with the present disclosure may take into consideration various boundaries such as the dynamic real-time turbine de-rating, dynamic real-time synchronous generator curve de-rating and under excitation limit of exciter (10% less than de-rated excitation limit). Equations 1, 2, 3, and 4 may be used to calculate equal percentage loading when the generator load destinations are above the MW Base Set point values. Additional calculations may be used for deviations of total power requests which are below the MW Base set point values.

The required percent deviation from nominal is calculated using Eq. 1. The variable $\text{System}_{Load}$ is the total present output of all generators (MW). The variable $\text{Total}_{Capacity}$ is the plant load.

$$\% \text{ Deviation} = \frac{\text{System}_{Load} - \sum_{i=1}^{n} MwBaseSP_{GENi}}{\text{Total}_{Capacity} - \sum_{i=1}^{n} MwBaseSP_{GENi}} \quad \text{Eq. 1}$$

The variable $\text{Total}_{Capacity}$ is equal to the summation of all generator capacity, where the generator capacity is the least of the following three factors: user-entered upper-regulation limit (entered on the HMI), generator capability curve, and turbine capability. The variable $\text{Total}_{Capacity}$ may be calculated using Eq. 2.

$$\text{Total}_{Capacity} = \sum_{i=1}^{n} \text{Generator\_Capacity} \quad \text{Eq. 2}$$

A percent deviation may be determined for each individual generator. Eq. 3 may be used to calculate the individual generator deviation based on the difference of the individual generator capacity and MW Base Set point, multiplied by the percent deviation.

$$\text{Deviation}_{GENi} = \% \text{ Deviation} * (\text{Generator\_Capacity}_{GENi} - MWBaseSP_{GENi}) \quad \text{Eq. 3}$$

Eq. 4 may be used to calculate a new power request for the generator control unit.

$$\text{PowerRequest}_{GENi} = MWBaseSP_{GENi} + \text{Deviation}_{GENi} \quad \text{Eq. 4}$$

The output of load sharing dispatch subsystem 210 may be provided to the power control subsystem 212. A feedback signal from the generator may be provided. The output may also be provided to a plurality of distributed controllers.

A governor 220 of a generator may receive the speed/MW set point from the power control subsystem 212. The speed set point may be an input to a summing junction, together with the speed measured by a tooth wheel coupled to the rotor of the generator. A variable reluctance sensor (also known as a magnetic pickup unit or MPU) positioned with a pole piece in proximity to the teeth of the tooth wheel. As the teeth move past the pole piece, a periodic frequency voltage may be induced in a coil wrapped around the pole piece. A corresponding signal generated by the MPU may be used to determine a rotor angle in various embodiments. The speed/MW error of the generator may provide an input to a speed/droop control subsystem 222. The output of the speed/droop control subsystem 222 may control a turbine valve or utilize other mechanisms to change the energy provided to a prime mover of an electrical generator.

Figure 3:
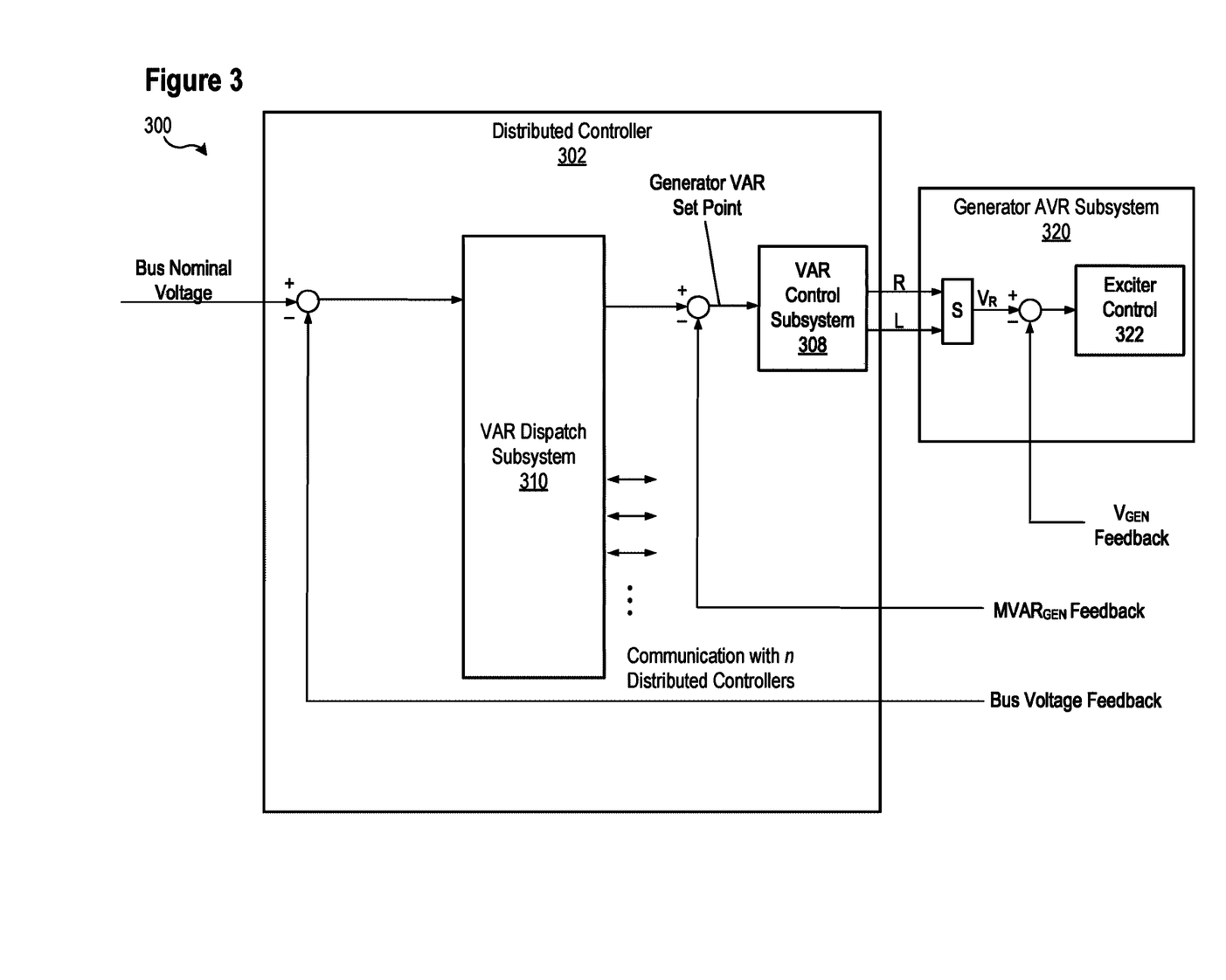
FIG. 3 illustrates a functional block diagram of a system comprising a distributed controller configured to coordinate with a plurality of other distributed controllers in an electrical power system consistent with embodiments of the present disclosure.

FIG. 3 illustrates a functional block diagram of a system 300 comprising a distributed controller 302 configured to coordinate with a plurality of distributed controllers reactive power of an electrical power system consistent with embodiments of the present disclosure. The nominal voltage of the system is an input to the distributed controller 302. The nominal voltage and the bus voltage feedback are inputs to a summing function, which determines the difference between the nominal voltage and the actual voltage. The error in the voltage may be provided as an input to a VAR dispatch subsystem 310. VAR dispatch subsystem 310 may be configured to communicate with the plurality of distributed controllers. Based on the difference between the nominal voltage and the bus voltage feedback for an associated generator and communications received from the plurality of distributed controllers, VAR dispatch subsystem may establish a generator VAR set point. A VAR control subsystem 308 may receive the generator VAR set point and output parameters The output of the VAR control subsystem 308 may be provided to a generator AVR subsystem 320, which may receive a feedback signal $V_{GEN}$. The input from the VAR control subsystem 308 and the feedback signal $V_{GEN}$ may be input to a summing function, which in turn provides an input to the exciter control 322 of the generator.

Figure 4:
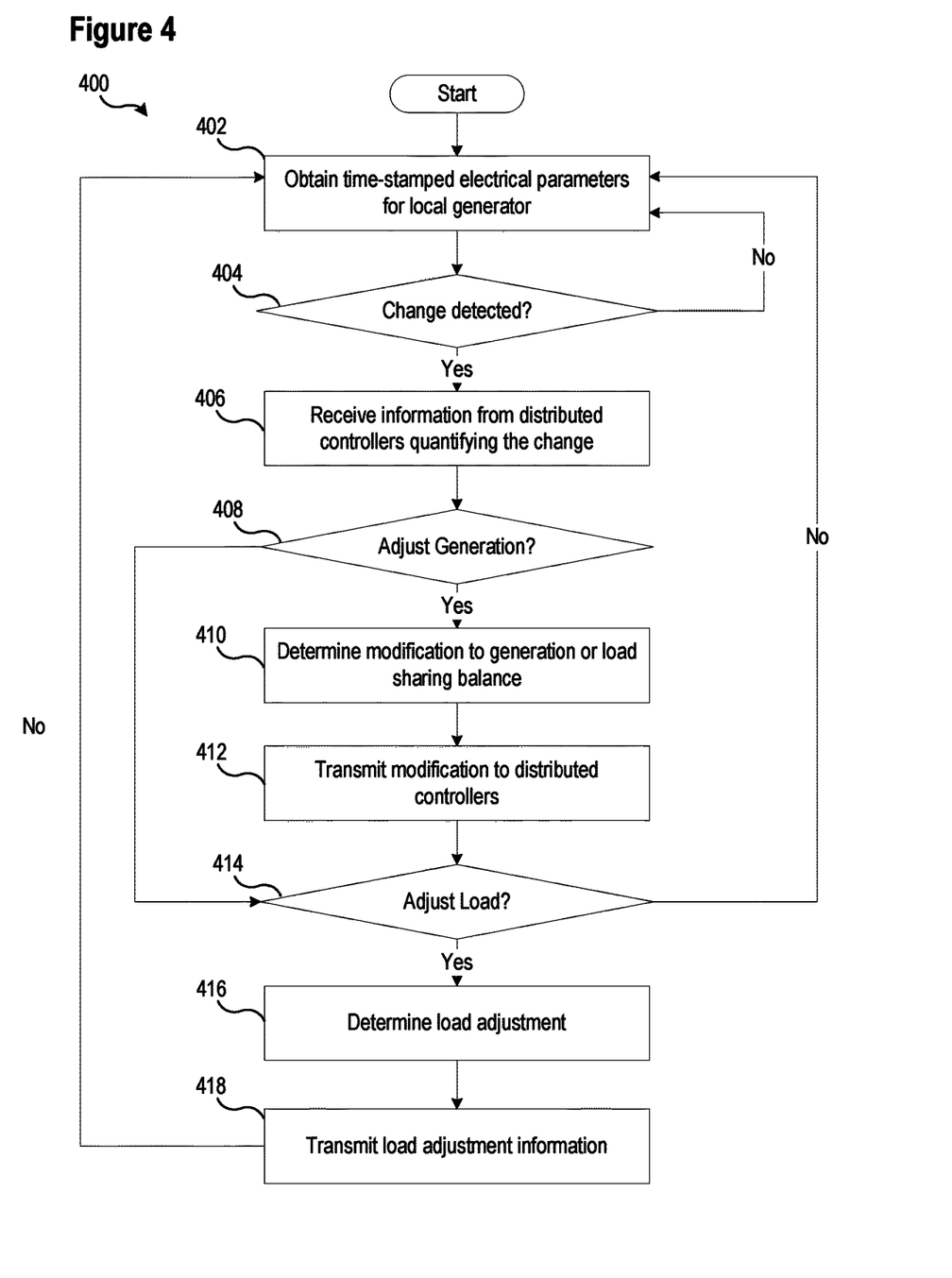
FIG. 4 illustrates a flow chart of a method to control a plurality of electrical generators using a distributed control system consistent with embodiments of the present disclosure.

FIG. 4 illustrates a flow chart of a method 400 to control a plurality of electrical generators using a distributed control system consistent with embodiments of the present disclosure. At 402, a plurality of time-stamped electrical parameters for a local generator may be obtained. In various embodiments, the time-stamped measurements may comprise voltage, current, and frequency measurements associated with the output of the local generator. A common time source available to the plurality of distributed controllers, such as a GNSS time source, may be used to determine the time stamp applied to the measurements. In some embodiments, the measurements may comprise synchrophasor measurements.

At 404, method 400 may determine whether a change is detected. The change may represent a change affecting the local generator or another generator associated with another distributed controller. Such changes may include changes in frequency, voltage, current, power output, etc. Upon the detection of a change, information about the change may be exchanged. Alternatively, in some embodiments, distributed controllers may provide a continuous stream of information quantifying the electrical parameters rather than providing a specific communication in response to detecting a change in the electrical parameters.

At 406, information from distributed controllers quantifying the change may be received. Various types of information may be provided to quantify the change, including absolute values, differential values, etc. In one specific example, the information may pertain to an instantaneous change in the power output of each of a plurality of generators following disconnection of a load from the electrical power system. One or more of the distributed controllers may determine the sum of the instantaneous changes from all of the generators. The sum of the changes is equal to the lost load.

At 408, method 400 may determine whether the change necessitates an adjustment to the generation of the system. If no change is necessary, method 400 may return to 402. Otherwise, at 410, an appropriate modification may be determined to the generation or the load sharing balance. Continuing the example from the previous paragraph regarding disconnection of a load, if the load is of sufficient magnitude, the system may reduce generation capacity of the system. In other words, the system may shed generation capacity. Alternatively, the load sharing may be adjusted to maintain an equal load share among the generators because the generator nearest to the lost load may experience the greatest change in the power output. Once the appropriate modification has been determined, the modification may be transmitted to the distributed controllers at 412.

At 414, method 400 may determine whether the change necessitates a change in the load. For example, the change may correspond to a decrease in generation that necessitates load shedding, connecting VAR support. An appropriate adjustment may be determined at 416. At 418, the load adjustment may be transmitted to the plurality of distributed controllers.

Figure 5:
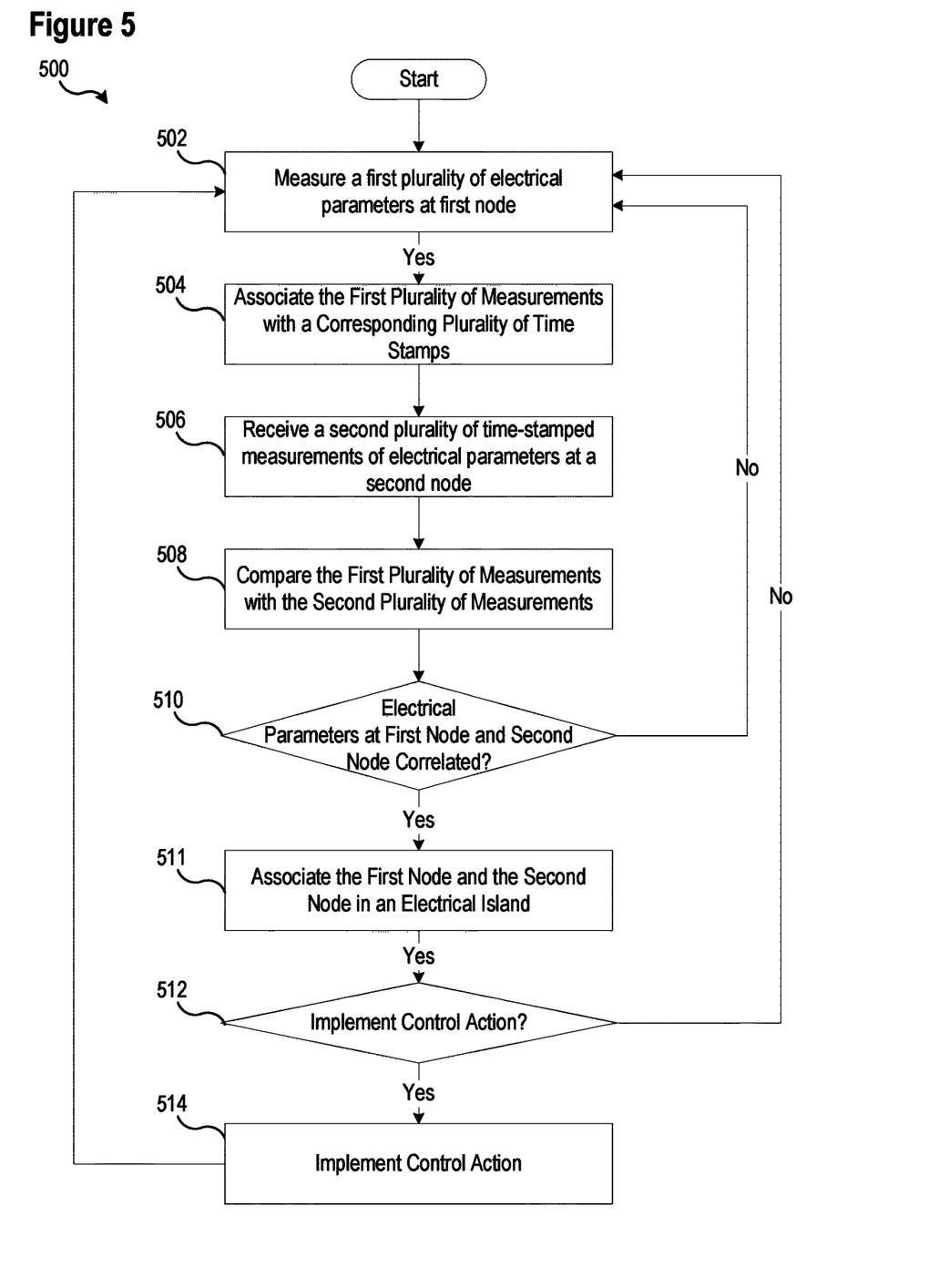
FIG. 5 illustrates a flow chart of a method for determining topology of an islanded electrical system using time-synchronized measurements of electrical parameters consistent with embodiments of the present disclosure.

FIG. 5 illustrates a flow chart of a method 500 for determining topology of an islanded electrical system using time-synchronized measurements of electrical parameters consistent with embodiments of the present disclosure. At 502, a first plurality of electrical parameters may be measured at a first node. The first plurality of electrical parameters may comprise current, voltage, frequency, and the like. In some embodiments, the measurements may be made by a distributed controller associated with a first electrical generator, and the first node may be the output of the first electrical generator.

At 504, the first plurality of measurements may be associated with a corresponding plurality of time stamps. In various embodiments, the plurality of time stamps may be determined using a GNSS time signal or other high-quality time source available to a plurality of controllers within a system.

At 506, a second plurality of time-stamped measurements of electrical parameters at a second node may be received. In various embodiments, the second plurality of time-stamped measurements may be received from a distributed controller and the second node may be the output of a second generator.

At 508, the first plurality of measurements may be compared with the second plurality of measurements. At 510, the comparison may be evaluated to determine whether the electrical parameters at the first node and the electrical parameters at the second node are correlated. In various embodiments, the electrical parameters may be correlated using a variety of parameters, such as a standing angle, system frequency, etc. If the electrical parameters are not correlated, method 500 may return to 502.

At 511, method 500 may associate the first node and the second node in an electrical island. The association of two nodes in an island may be used to evaluate and/or implement various control actions. At 512, method 500 may determine whether to implement a control action. In one embodiment, method 500 may determine whether two generators are part of the same electrical island. In another embodiment, method 500 may be used to synchronize two generators. In each of these embodiments, the correlation between the electrical parameters in the first node and the second node may be used as a basis to perform a specific action, which may be implemented at 514.

Figure 6:
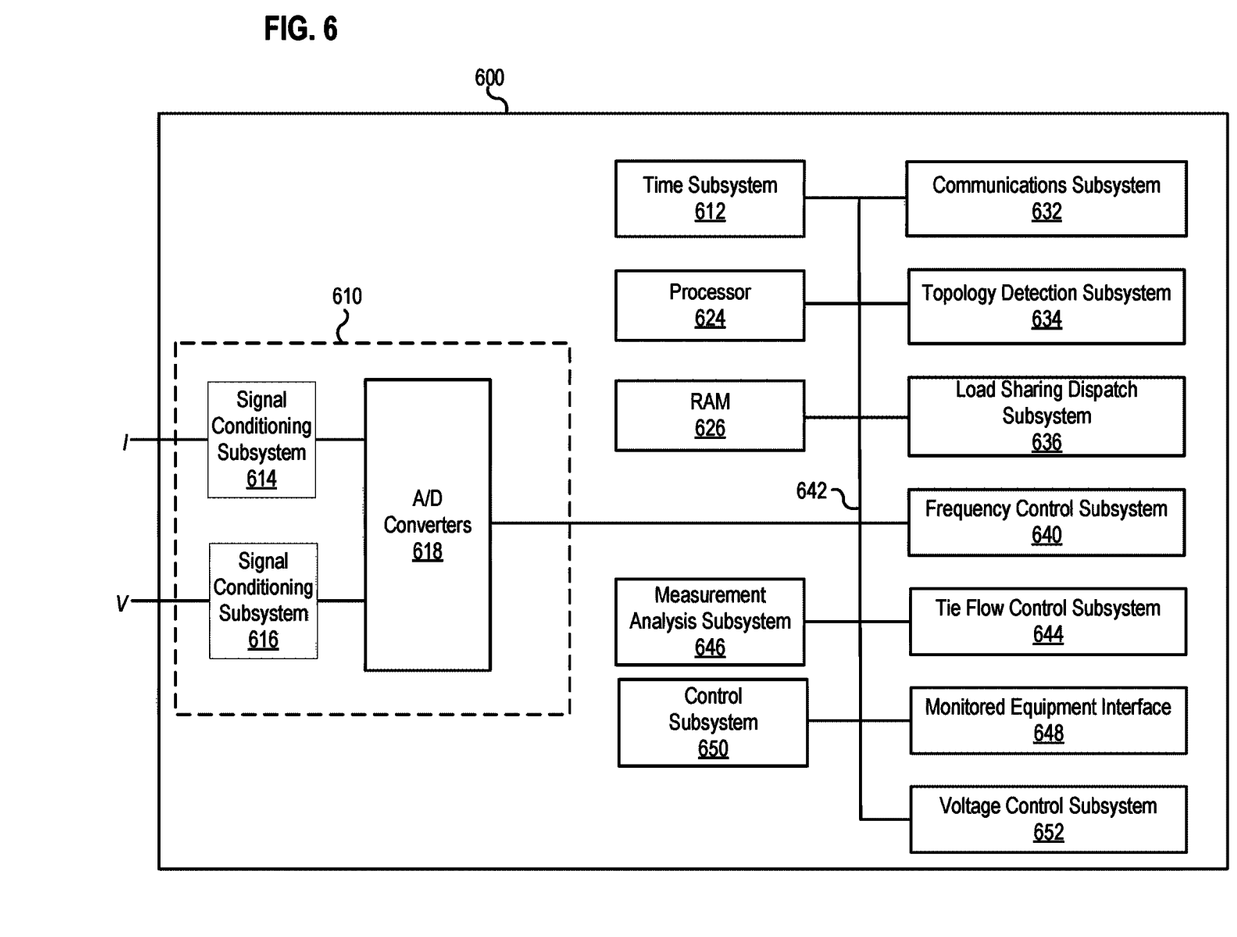
FIG. 6 illustrates a functional block diagram of a distributed controller configured to operation in connection with a plurality of other distributed controllers to coordinate the operation of a plurality of generators in an electrical generation and distribution system consistent with embodiments of the present disclosure.

FIG. 6 illustrates a functional block diagram of a distributed controller 600 configured to operation in connection with a plurality of other distributed controllers to coordinate the operation of a plurality of generators in an electrical generation and distribution system consistent with embodiments of the present disclosure. In some embodiments, distributed controller 600 may be implemented using hardware, software, firmware, and/or any combination thereof. Moreover, certain components or functions described herein may be associated with other devices or performed by other devices. The specifically illustrated configuration is merely representative of one embodiment consistent with the present disclosure. A data bus 642 may facilitate communication among various components of distributed controller 600.

Distributed controller 600 includes a communications subsystem 632 configured to communicate with other devices (not shown), including other distributed controllers. Distributed controller 600 may further include a time subsystem 612, which may be used to receive a time signal (e.g., a common time reference) allowing distributed controller 600 to associate data with a time-stamp received from time system 612. In certain embodiments, a common time signal may be received via communications subsystem 632. One such embodiment may employ the IEEE 1588 protocol. The IEEE 1588 standard includes hardware-assisted timestamps, which allow for time accuracy in the nanosecond range. Such precision may be sufficient for more demanding applications (e.g., the sampling of the sinusoidal currents and voltages on power lines to calculate synchrophasors).

Processor 624 may be configured to process communications received via communications subsystem 632, time subsystem 612, and to coordinate the operation of the other components of distributed controller 600. Processor 624 may operate using any number of processing rates and architectures. Processor 624 may be configured to perform any of the various algorithms and calculations described herein. Processor 624 may be embodied as a general purpose integrated circuit, an application specific integrated circuit, a field-programmable gate array, and/or any other suitable programmable logic device. Instructions to be executed by processor 624 may be stored in random access memory 626 (RAM).

In certain embodiments, distributed controller 600 may include a sensor component 610. In the illustrated embodiment, sensor component 610 is configured to gather data directly from equipment such as a conductor in an electric power distribution system. The sensor component 610 may include signal conditioning subsystems 614, 616 that are configured to condition the signal for use by distributed controller 600. In some embodiments, the signal conditioning subsystems 614, 616 may include transformers configured to step down a voltage or current to a suitable level for use by distributed controller 600 or filters configured to limit the bandwidth of signals. Sensor component 610 may further include ND converters 618 that may sample and/or digitize conditioned waveforms to form corresponding digitized signals. The digitized signals may be provided to data bus 642 and accessed by other components of distributed controller 600. In various embodiments, distributed controller 600 may be configured to interpolate the digitized signals created by sensor component 610.

Topology detection subsystem 634 may be configured to determine electrical connections within a system. In some embodiments, the topology detection subsystem 634 may be configured to identify generators that are electrically connected. In one specific embodiment, topology detection subsystem 634 may be configured to implement method 600, as illustrated in FIG. 5.

Returning to a discussion of FIG. 6, load sharing dispatch subsystem 636 may be configured to control generator and to coordinate with a plurality of other distributed controllers the operation of a plurality of other generators. In various embodiments, load sharing dispatch subsystem 636 may implement an equal percentage load sharing method. In such embodiments, the generators are loaded equally so that when a power system disturbance occurs, the generators governors have the maximum available to capacity to increase or decrease the output of the generators. Load sharing dispatch subsystem 636 may further be configured to shed generation capacity dynamically.

Frequency control subsystem 640 may be configured to control the frequency of a plurality of generators. The frequency control subsystem 640 may be configured in various embodiments to synchronize generators to an electric system prior to electrically connecting such generators. In various embodiments, frequency control subsystem 640 may operate in conjunction with system 200, as illustrated in FIG. 2.

Tie flow control subsystem 644 may be configured to manage a utility tie. In various embodiments electrical energy may be received from a utility. Utility power may supplement power generated from generators in a system associated with distributed controller 600 when the power generated is insufficient to satisfy the requirements of the load.

A measurement analysis subsystem 646 may be configured to analyze and compare a plurality of time-synchronized measurements. In some embodiments, measurement analysis subsystem 646 may be configured to identify disconnection of an electrical load based on a resulting acceleration of a plurality of generators supplying the load. In such embodiments, measurement analysis subsystem 646 may receive information quantifying an instantaneous change in the power output of each of a plurality of generators following disconnection of a load from the electrical power system. The sum of the instantaneous changes from all of the generators may be determined, and may be equal to the electrical energy supplied to the lost load.

A monitored equipment 648 may be configured to receive status information from, and issue control instructions to monitored equipment (e.g., a circuit breaker, a recloser, etc.). In some embodiments, the monitored equipment interface 648 may be in communication with a breaker configured to selectively connect to or disconnect an electrical generator from an electrical power generation system.

A control subsystem 650 may be configured to control monitored equipment in communication with distributed controller 600. In one embodiment, control subsystem 650 may be in communication with a generator and may be configured to control operating parameters of the generator (e.g., speed, phase, excitation voltage, output power, etc.). In some embodiments, the control subsystem 650 may receive an output power set point from the load sharing dispatch subsystem, and may provide a set point to a governor of a generator. In other embodiments, control subsystem 650 may be configured to selectively actuate a breaker. In one specific embodiment, the breaker may be associated with the output of an electrical generator, and controller 600 may be configured to synchronize the generator to an electrical generation and distribution system before connecting the generator to the system.

A voltage control subsystem 652 may be configured to control the voltage of a plurality of generators. The frequency control subsystem 640 may be configured in various embodiments to match the output voltage of generators in an electric system prior to electrically connecting such generators. In various embodiments, voltage control subsystem 652 may operate in conjunction with system 300, as illustrated in FIG. 3.

While specific embodiments and applications of the disclosure have been illustrated and described, it is to be understood that the disclosure is not limited to the precise configurations and components disclosed herein. For example, the systems and methods described herein may be applied to an industrial electric power delivery system or an electric power delivery system implemented in a boat or oil platform that may not include long-distance transmission of high-voltage power. Moreover, principles described herein may also be utilized for protecting an electric system from over-frequency conditions, wherein power generation would be shed rather than load to reduce effects on the system. Accordingly, many changes may be made to the details of the above-described embodiments without departing from the underlying principles of this disclosure. The scope of the present invention should, therefore, be determined only by the following claims.

What is claimed is:

1. A distributed controller configured to control at least a portion of an electrical generation and distribution system, comprising:
a communication subsystem configured to communicate via a network and configured to:
obtain a first plurality of time-stamped electrical parameter measurements from a first node;
a measurement analysis subsystem configured to:
compare the first plurality of time-stamped electrical parameter measurements and a second plurality of time-stamped electrical parameter measurements;
determine a correlation between the electrical parameters at the first node and the electrical parameters at a second node;

a topology detection subsystem configured to:
  associate the first node and the second node in an electrical island based on the correlation;
a control subsystem configured to:
  implement a control action based on the association of the first node and the second node in the electrical island.

2. The distributed controller of claim 1, wherein the first node comprises an output of a first electrical generator and the second node comprises an output of a second electrical generator.

3. The distributed controller of claim 2, wherein the control subsystem is further configured to:
  synchronize the output of the first electrical generator with the output of the second electrical generator;
  wherein the control action comprises electrically connecting the first electrical generator and the second electrical generator.

4. The distributed controller of claim 2, further comprising a load sharing dispatch subsystem configured to implement an equal percentage loading scheme to equally balance a load between the first electrical generator and the second electrical generator;
  wherein the control action comprises adjusting the output of one of the first electrical generator and the second electrical generator to maintain the equal balance.

5. The distributed controller of claim 4, further comprising: a power control subsystem configured to receive a set point from the load sharing dispatch subsystem and to provide an input to a governor of the second generator.

6. The distributed controller of claim 2, further comprising a tie flow control subsystem configured to selectively draw electrical power from a utility tie connection to supplement electrical power generated by the first electrical generator and the second electrical generator.

7. The distributed controller of claim 2, further comprising a VAR dispatch subsystem configured to establish a VAR set point for the second electrical generator;
  wherein the communication subsystem is further configured to communicate the VAR set point for the second electrical generator to a remote distributed controller.

8. The distributed controller of claim 1, further comprising:
  a sensor component configured to monitor the second node and to acquire monitored electrical parameter measurements;
  a time subsystem configured to associate the monitored electrical parameter measurements with a corresponding plurality of time stamps to create the second plurality of time-stamped electrical parameter measurements.

9. The distributed controller of claim 8, wherein the time subsystem is further configured to receive a common time signal available to the remote distributed controller.

10. The distributed controller of claim 8, wherein the communication subsystem is further configured to transmit the second plurality of time-stamped electrical parameter measurements to a remote distributed controller.

11. The distributed controller of claim 1, wherein the communication subsystem is further configured to transmit the control action to a remote distributed controller.

12. The distributed controller of claim 1, wherein the distributed controller is configured to operate the electrical generation and distribution system in an islanded configuration.

13. A method for controlling a plurality of electrical generators using a plurality of distributed controllers, the method comprising:
  obtaining first plurality of time-stamped electrical parameter measurements at a first node;
  obtaining a second plurality of time-stamped electrical parameter measurements at a second node;
  comparing the first plurality of time-stamped electrical parameter measurements and the second plurality of time-stamped electrical parameter measurements;
  determining a correlation between the electrical parameters at the first node and the electrical parameters at the second node;
  associating the first node and the second node in an electrical island based on the correlation;
  implementing a control action based on the association of the first node and the second node in the electrical island.

14. The method of claim 13, wherein the first node comprises an output of a first electrical generator and the second node comprises an output of a second electrical generator.

15. The method of claim 14, wherein the control action comprises synchronizing and electrically connecting the first electrical generator and the second electrical generator.

16. The method of claim 14, wherein the control action comprises implementing an equal percentage loading scheme to equally balance a load between the first electrical generator and the second electrical generator.

17. The method of claim 14, further comprising drawing electrical power from a utility tie connection to supplement electrical power generated by the first electrical generator and the second electrical generator.

18. The method of claim 14, wherein the control action comprises establishing a VAR set point for one of the first electrical generator and the second electrical generator.

19. The method of claim 13, further comprising:
  calculating an available incremental reserve margin associated with the first electrical generator and the second electrical generator;
  wherein the control action comprises a load shedding action based on the available incremental reserve margin.

20. The method of claim 13, wherein the correlation between the electrical parameters at the first node the electrical parameters at the second node comprises a standing angle.

21. The method of claim 13, wherein the first node and the second node are associated in the electrical island without a deterministic topology of the electrical generation and distribution system.

* * * * *